United States Patent
Borsa

(10) Patent No.: US 8,443,632 B2
(45) Date of Patent: *May 21, 2013

(54) TRANSVERSE ROW BUSHING SUPPORT

(75) Inventor: Alessandro G. Borsa, Evergreen, CO (US)

(73) Assignee: Johns Manville, Denver, CO (US)

(*) Notice: Subject to any disclaimer, the term of this patent is extended or adjusted under 35 U.S.C. 154(b) by 63 days.

This patent is subject to a terminal disclaimer.

(21) Appl. No.: 13/183,739

(22) Filed: Jul. 15, 2011

(65) Prior Publication Data

US 2012/0000250 A1 Jan. 5, 2012

Related U.S. Application Data

(63) Continuation of application No. 12/284,065, filed on Sep. 18, 2008, now Pat. No. 8,024,946.

(51) Int. Cl.
*C03B 5/00* (2006.01)
*C03B 37/085* (2006.01)
*F27B 7/20* (2006.01)

(52) U.S. Cl.
USPC .................. 65/495; 65/483; 65/498

(58) Field of Classification Search
USPC .................................... 65/495, 498
See application file for complete search history.

(56) References Cited

U.S. PATENT DOCUMENTS

| | | | | |
|---|---|---|---|---|
| 4,055,406 A | * | 10/1977 | Slonaker et al. | 65/498 |
| 5,312,470 A | * | 5/1994 | O'Brien-Bernini et al. | 65/499 |
| 5,935,291 A | * | 8/1999 | Kim et al. | 65/495 |
| 6,196,029 B1 | * | 3/2001 | Melia et al. | 65/499 |
| 7,003,986 B2 | * | 2/2006 | Hanna | 65/499 |
| 8,024,946 B2 | * | 9/2011 | Borsa | 65/495 |
| 2003/0089134 A1 | * | 5/2003 | Bemis et al. | 65/495 |
| 2005/0241342 A1 | * | 11/2005 | Hanna et al. | 65/493 |
| 2006/0065022 A1 | * | 3/2006 | Sullivan et al. | 65/495 |

* cited by examiner

*Primary Examiner* — Jodi C Franklin
(74) *Attorney, Agent, or Firm* — Robert D. Touslee

(57) ABSTRACT

According to the invention, a system for forming glass fiber from molten glass is disclosed. The system may include a tip plate, a plurality of tips, and a plurality of support members. The plurality of tips may include a plurality of rows of tips. Each of the plurality of support members may support the tip plate. Each of the plurality of support members may be located between two of the plurality of rows of tips.

11 Claims, 3 Drawing Sheets

TRANSVERSE ROW BUSHING SUPPORT

This application is a continuation of prior U.S. patent application Ser. No. 12/284,065, entitled "TRANSVERSE ROW BUSHING SUPPORT," filed Sep. 18, 2008, now U.S. Pat. No. 8,024,946, issued Sep. 27, 2011, the entire disclosure of which is hereby incorporated by reference, for all purposes, as if set forth fully herein.

BACKGROUND OF THE INVENTION

This invention relates generally to glass fiber forming systems. More specifically the invention relates to structural support methods for tip plates in such systems.

FIG. 1 shows a simplified typical prior art bushing system 100 for producing glass fiber from molten glass. Molten glass is fed to double rows of tips 110, and the molten glass extrudes through tips 110 and into apertures 120 of tip plate 130.

The components of system 100 are under intense physical and thermal stresses during this process. These stresses cause creep in tip plate 130, and consequent changes in shape and orientation of apertures 120. These changes, when not catastrophic, cause degradation of the quality and/or quantity of glass fiber which may be produced by bushing system 100. When the catastrophic failure occurs due to creep in tip plate 130 and/or other components, bushing system 100 must be shut down and replaced.

Ceramic supports 140 provide some support for tip plate 120 to ameliorate creep of system 100 components. Ceramic supports 140 are supported by a bushing frame, external to bushing system 100. Internal longitudinal structural elements 150 and internal transverse structural elements 160 also provide some rigidity and amelioration of creep in bushing system 100.

Tip plate 130 and structural elements 150, 160 are typically made from platinum, rhodium, and/or other precious metal alloys. These expensive alloys are necessary because of the intense physical and thermal stresses borne by the bushing system 100.

Because of the ever increasing price of precious metal alloys, solutions are required to reduce the amount of precious metal alloys used in construction of bushing system 100 and/or increase the life-span of bushing system 100. Embodiments of the present invention provide solutions to these and other problems.

BRIEF DESCRIPTION OF THE INVENTION

In one embodiment, a system for forming glass fiber from molten glass is provided. The system may include a tip plate, a plurality of tips, and a plurality of support members. The plurality of tips may include a plurality of rows of tips. Each of the plurality of support members may support the tip plate. Each of the plurality of support members may be located between two of the plurality of rows of tips.

In another embodiment, another system for forming glass fiber from molten glass is provided. The system may include a first means, a second means, and a third means. The first means may be for extruding the glass fiber from the molten glass. The second means may be for providing the molten glass to the first means. The third means may be for supporting the first means.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Figure 1:
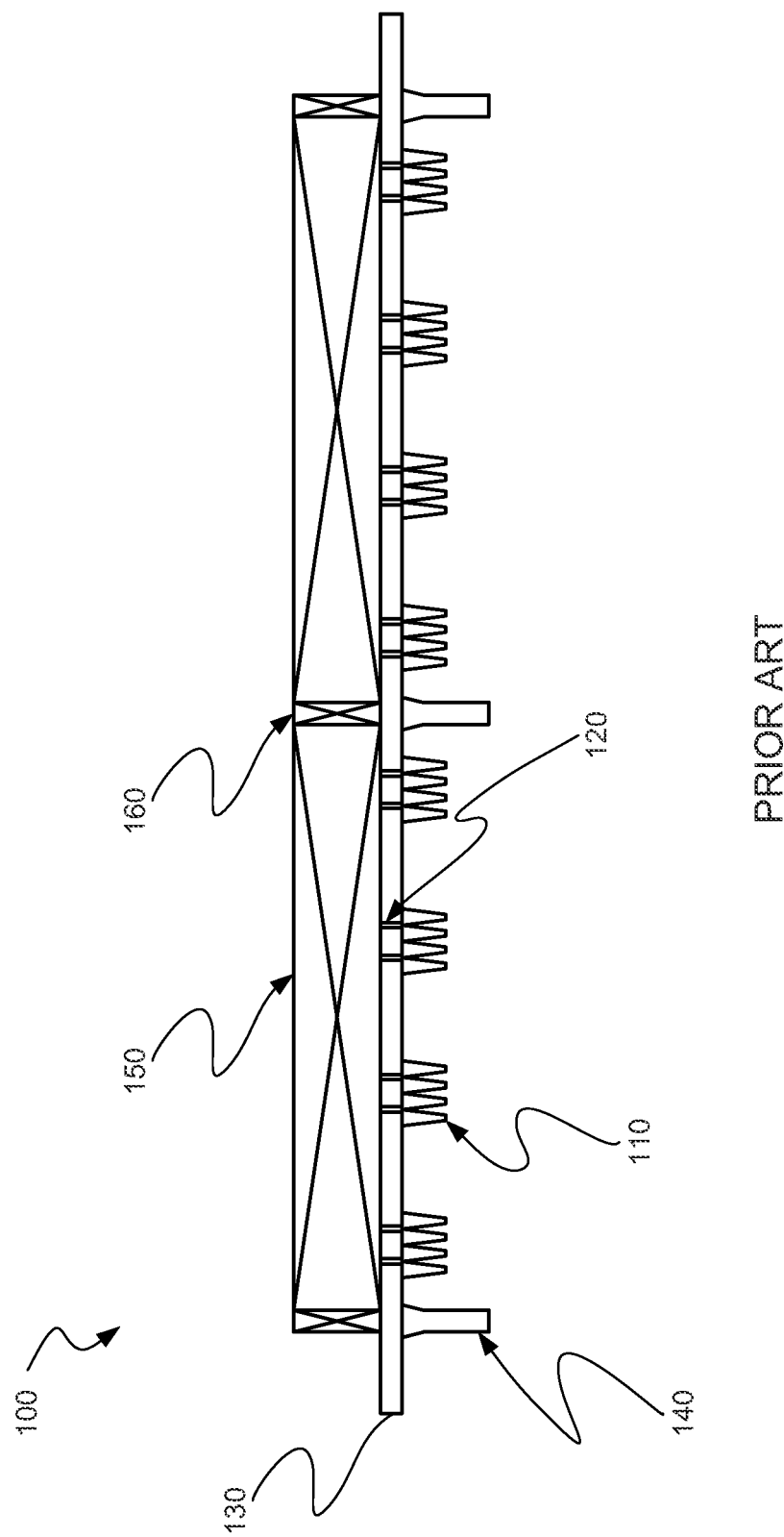
FIG. 1 is side view of a prior art system for forming glass fiber from molten glass.
Figure 2:
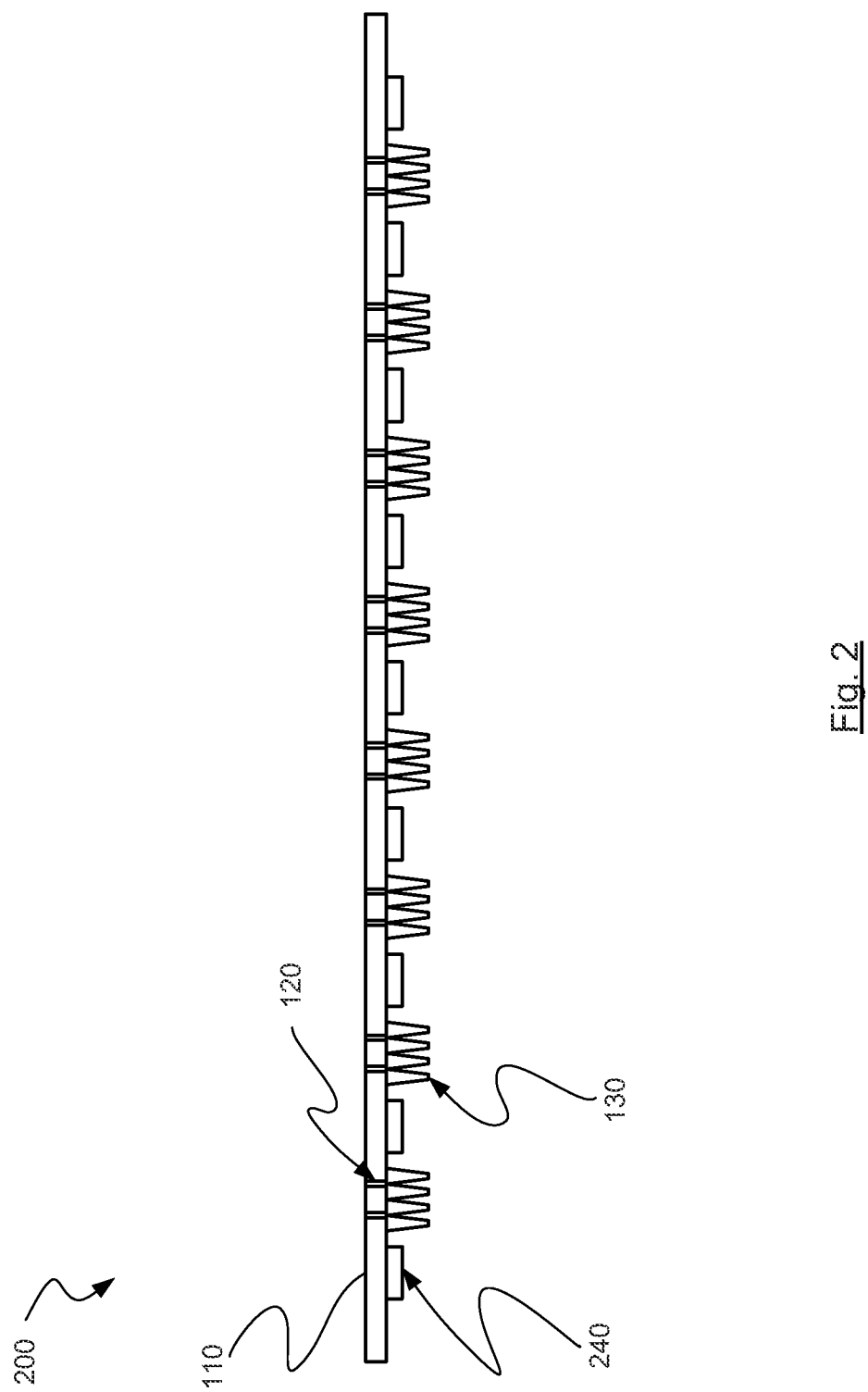
FIG. 2 is a side view of an embodiment of the present invention for forming glass fiber from molten glass using rectangular cross section support members to support the tip plate.

In one embodiment of the invention, a system for forming glass fiber from molten glass is provided. Turning now to FIG. 2, one possible embodiment of the invention is shown. The system 100 may include a tip plate 110 having a plurality of apertures 120, a plurality of tips 130, and a plurality of support members 240. Support members 240 may be in-turn be supported by a bushing frame (not shown).

Tip plate 110 may be made from a platinum alloy, a rhodium alloy, and/or other materials. Plurality of apertures 120 in tip plate 110 may be the extrusion point for glass fiber formed through tip plate 110.

Plurality of tips 130 may include a plurality of rows of tips. In this embodiment, eight double rows of tips are shown. In other embodiments different configurations may be possible.

Figure 3:
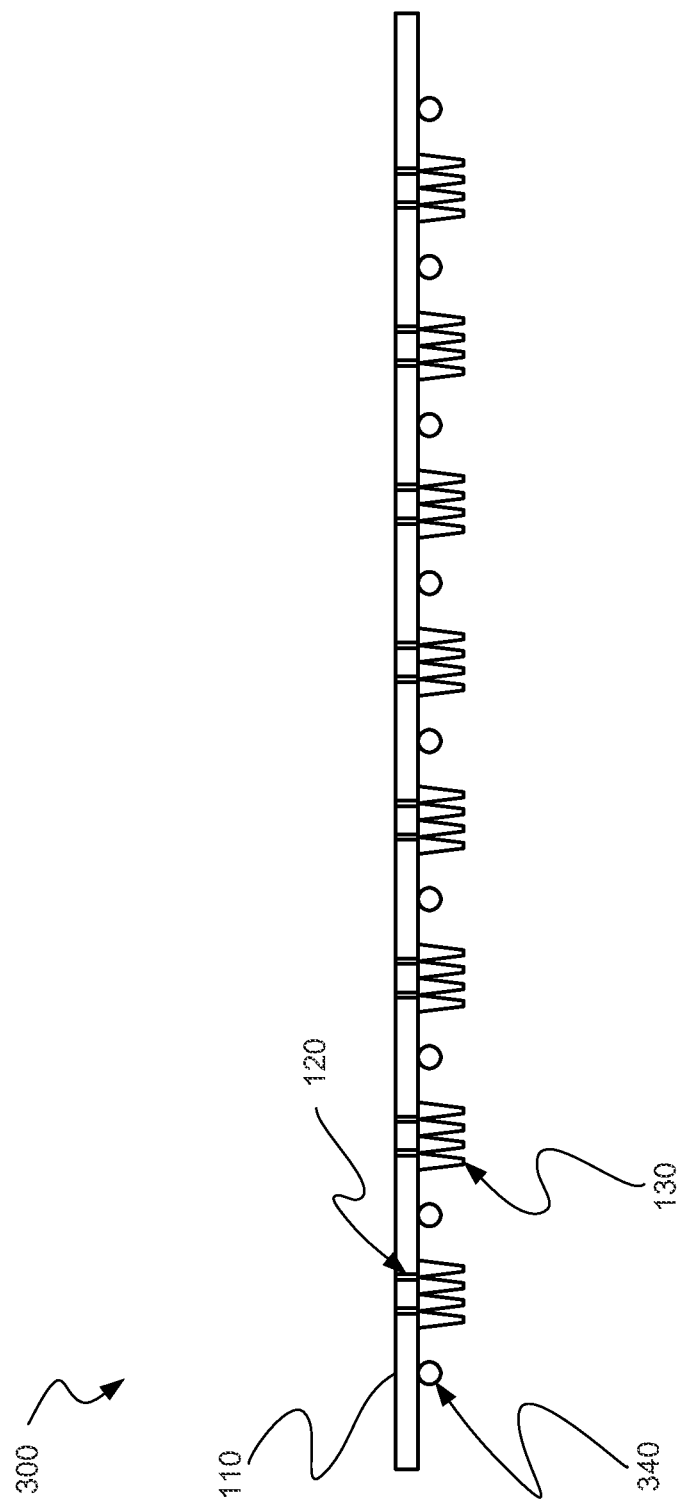
FIG. 3 is a side view of an embodiment of the present invention for forming glass fiber from molten glass using circular cross section support members to support the tip plate.

Each of the plurality of support members 240 may support tip plate 110. Each of the plurality of support members 240 may be located between two of the plurality of rows of tips 130. In some embodiments, support members 240 may have a rectangular cross section, as shown in FIG. 2. In an exemplary embodiment, support members 240 may have a width of about 5.75 millimeters and a height of about 2 millimeters. In other embodiments, such as the one shown in FIG. 3, support members 340 may have a circular cross section.

In some embodiments, the dimensions of support members 240, 340 may be such that they do not protrude below the bottom surface of tips 130. In these or other embodiments, the dimension of support members 240, 340 may be such that longitudinal (left to right on Figs.) expansion and contraction of tip plate 110 is allowed during operation (where temperatures may reach 2000° F. and greater). The dimensions of support members 240, 340 in these embodiments may be such that tips 130 will not be impacted by support members 240, 340 during period of thermal expansion and contraction.

In some embodiments, support members 240, 340 may be constructed of materials resistant to thermal shock and oxidation. In these or other embodiments, support members 240, 340 may also be constructed of materials which are resistant to corrosion, especially that possibly caused by unintended molten glass flows in the glass fiber forming process.

In some embodiments, support members 240, 340 may be made from various materials. In some embodiments, for example, support members 240, 340 may include the nickel based alloy PM 1000 or other oxide dispersion strengthened materials. In some embodiments, alumina or other ceramic material may also be employed. Whatever materials are employed, they may have creep rates which are substantially lower than precious metal alloys employed in prior art systems.

Because support members 240, 340 are (a) more numerous, (b) of differing materials, (c) located underneath instead of inside, and/or (d) of differing dimensions than the interior structural members 150, 160 and ceramic supports 140 of bushing system 100, bushing system 200, 300 may have a longer life span and require less precious metal alloys in their construction. Longer lifespan may occur because support members 240, 340, being outside of bushing systems 200, 300 may be replaced, possibly during operation, meaning increased efficiency as well for bushing systems 200, 300.

Additionally, the thickness of tip plate 130 may be decreased, possibly from about 1.5 millimeters to about 1.0 millimeters, further decreasing the amount of precious metal alloy necessary for construction of bushing system 200, 300 (36% by weight in the mentioned example). Other portions of bushing systems 200, 300 not shown in FIG. 2 and FIG. 3 may also be reduced in size, including, merely by way of example, ear portions, end-walls, and sidewalls. Furthermore, because fewer components are present in bushing systems 200, 300 over prior art systems, fewer welding and/or other fabrication techniques are employed during construction. Welds and/or other fabrication techniques and systems add additional time and cost to construction of bushing systems, as well as increase the number of locations, and therefore probability, of glass leaks during operation.

In another embodiment of the invention, another system for forming glass fiber from molten glass is provided. The system may include a first means, a second means, and a third means. The system may also include any of the other components, features, and/or characteristics discussed herein.

In some embodiments, the first means may be for extruding the glass fiber from the molten glass. Merely by way of example, in some embodiments, the first means may include the tip plate and/or any other component discussed herein, as well as any other means known now or in the future for extruding the glass fiber from the molten glass.

In some embodiments, the second means may be for providing the molten glass to the first means. Merely by way of example, in some embodiments, the second means may include the plurality of tips and/or any other component discussed herein, as well as any other means known now or in the future for providing the molten glass to the first means.

In some embodiments, the third means may be for supporting the first means. Merely by way of example, in some embodiments, the third means may include the support members and/or any other component discussed herein, as well as any other means known now or in the future for supporting the first means.

A number of variations and modifications of the invention can also be used within the scope of the invention. For example, any number of possible cross sectional shapes for support members may be employed. Likewise, any number of rows of tips may be employed in different embodiments. Those skilled in the art will also now recognize that the embodiments of the invention may be scaled, and that the embodiments discussed herein are exemplary in nature.

The invention has now been described in detail for the purposes of clarity and understanding. However, it will be appreciated that certain changes and modifications may be practiced within the scope of the appended claims.

What is claimed is:

1. A system for forming glass fiber from molten glass, wherein the system comprises:
   a tip plate;
   a plurality of tips, wherein the plurality of tips comprises a plurality of rows of tips; and
   a plurality of support members, wherein:
      at least one of the plurality of support members has a rectangular cross section having a width and a height, wherein the width is greater than the height and the width is parallel with a bottom surface of the tip plate;
      each of the plurality of support members supports the tip plate from underneath the tip plate; and
      the plurality of support members are arranged such that all adjacent rows of tips include one of the support members positioned between said adjacent rows.

2. The system for forming glass fiber from molten glass of claim 1, wherein the tip plate comprises a planar member with a plurality of apertures.

3. The system for forming glass fiber from molten glass of claim 1, wherein each tip comprises a nozzle with a passageway in fluid communication with an aperture in the tip plate.

4. The system for forming glass fiber from molten glass of claim 1, wherein each of the plurality of rows of tips comprises sub-rows of paired tips.

5. The system for forming glass fiber from molten glass of claim 1, wherein:
   each tip has a height; and
   the height of at least one tip is greater than the height of the at least one of the plurality of support members.

6. The system for forming glass fiber from molten glass of claim 1, wherein at least one of the plurality of support members comprises an oxide-dispersed-strengthened super-alloy.

7. The system for forming glass fiber from molten glass of claim 1, wherein at least one of the plurality of support members comprises a ceramic.

8. The system for forming glass fiber from molten glass of claim 1, wherein each of the plurality of support members is configured to be removed and replaced during any point of operation of the system.

9. A system for forming glass fiber from molten glass, wherein the system comprises:
   a tip plate;
   a plurality of tips, wherein the plurality of tips comprises a plurality of rows of tips; and
   a plurality of support members, wherein:
      at least one of the plurality of support members has a rectangular cross section having a width and a height, wherein the width is greater than the height, and the width is parallel with a bottom surface of the tip plate;
      each of the plurality of support members supports the tip plate from underneath the tip plate; and the plurality of support members are positioned between said adjacent rows.

10. The system for forming glass fiber from molten glass of claim 1, wherein the tip plate has a total thickness of about 1.0 millimeter.

11. The system for forming glass fiber from molten glass of claim 9, wherein the plurality of support members are arranged such that all adjacent rows of tips include one of the support members positioned between said adjacent rows thereby allowing the tip plate to have a total thickness of between about 1.5 millimeters and about 1.0 millimeter.

* * * * *